Dec. 28, 1965     I. SIMON     3,225,608
DIAMAGNETIC SUSPENSION SYSTEM
Filed Nov. 27, 1962     2 Sheets-Sheet 1
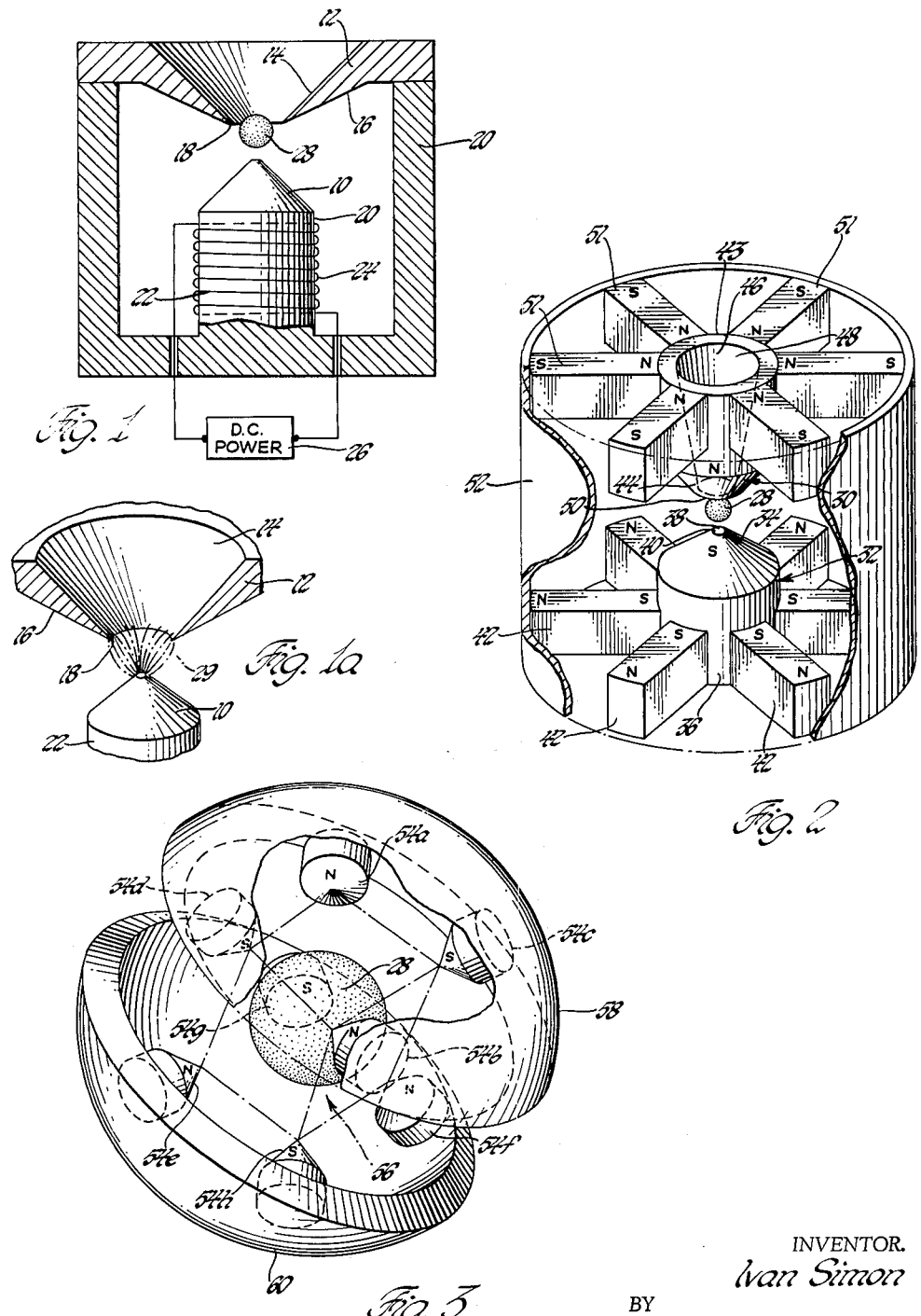
INVENTOR.
Ivan Simon
BY
Paul J. Ethington
ATTORNEY Dec. 28, 1965     I. SIMON     3,225,608
DIAMAGNETIC SUSPENSION SYSTEM
Filed Nov. 27, 1962     2 Sheets-Sheet 2

INVENTOR.
Ivan Simon
BY
Paul J. Ethington
ATTORNEY

United States Patent Office 3,225,608
Patented Dec. 28, 1965

3,225,608
DIAMAGNETIC SUSPENSION SYSTEM
Ivan Simon, Belmont, Mass., assignor, by mesne assignments, to General Motors Corporation, Detroit, Mich., a corporation of Delaware
Filed Nov. 27, 1962, Ser. No. 240,303
27 Claims. (Cl. 74—5.6)

This invention relates to a diamagnetic suspension system wherein a diamagnetic body may be freely suspended in stable equilibrium within a magnetic field of a special configuration characterized by high inhomogeneity. The invention further relates to novel means for producing the highly inhomogeneous magnetic field and, further, to the combination thereof with means to provide a novel direction or attitude sensing instrument.

The phenomenon of diamagnetism and its distinction from paramagnetism is based on the reaction of the atoms of certain materials to the force produced by a magnetic field. Fundamentally, the magnetic moment of an atom comprises the combination of the magnetic moment of the electrons spinning on their axes, the nucleus spinning on its axis, and the magnetic moment produced by the orbital motion of the electrons. When subjected to an external magnetic field, the spin magnetic moments of the nucleus and the electrons tend to line up with the direction of the field and aid it. However, the external magnetic field also causes a precession of the orbital motion of the electrons, and this orbital motion produces a magnetic moment in the direction opposite to the applied field. In paramagnetic materials, the spin magnetic moments greatly exceed those produced by the orbital motions of the electrons. Thus, these materials are said to possess a positive magnetic susceptibility. However, in a diamagnetic material the predominant magnetic moment arises from the orbital motions of the electrons. Thus, materials of this type are said to possess a negative magnetic susceptibility.

Proceeding on the principles outlined above, it can be shown that the magnetic moment of a diamagnetic body tends to move the body out of a magnetic field. Thus, if the diamagnetic body is placed in a highly inhomogeneous magnetic field, the body is subjected to a force tending to move it in the direction of decreasing field intensity. This force is proportional to the volume of the body, the magnetic susceptibility and the square of the magnetic field gradient. Having established the relation between the force and the factors which determine its magnitude, it can be seen that the higher the gradient, that is, the more inhomogeneous the field is made, the higher will be the force tending to move a diamagnetic body of specific dimensions in the direction of the decreasing field intensity.

In an article appearing in Zeitschrift Fur Physik, volume 122, April 1939, pages 753 to 769, by Werner Braunbek, it was shown to be impossible to produce the condition of stable equilibrium in the free suspension of a magnetic body without the presence of diamagnetic material in the system. A technically stable condition of equilibrium may be produced through the use of a feedback system employing an electromagnet and means to automatically regulate the excitation current thereof in accordance with the position of the body which is suspended in the field produced by the electromagnet. The development of feedback systems of this type is disclosed in greater detail in the Review of Scientific Instruments, Volume II, page 398 (1940) and later publications.

It is also known to freely support a superconductive body by means of a magnetic field. A brief description of the principle involved is given in the following. For greater detail, see Journal of Applied Physics, volume 24, page 19 (1953). The support of a superconductive body depends upon the force produced by macroscopic electrical currents in the body rather than the atomic electron orbital currents prevalent in diamagnetic bodies. The use of superconductors has presented several technical limitations which do not apply to a diamagnetic system. For example, a cryogenic refrigeration system is required to maintain the body at the temperature at which the phenomenon of superconductivity occurs. Additionally, the supporting field intensity must be maintained within certain limits imposed on one hand by the weight of the supported body and on the other hand by a tendency of the field to quench the superconductivity at or beyond a critical field strength. Finally, the superconductivity is highly temperature sensitive and will be destroyed if the temperature of the body rises above the transition temperature. Thus, extreme care must be taken to avoid the generation of even minute quantities of heat in a magnetically supported superconducting body, such as the heat generated by eddy currents in the superconducting regions of the body. It has been found that the operative life time of many proposed devices utilizing rotating superconducting bodies becomes very short due to the heat generated by these eddy currents.

The magnetic suspension of diamagnetic bodies, in accordance with the present invention, is free of the limitations inherent in superconducting systems of this type. The diamagnetic effect of most materials exhibiting this characteristic is essentially independent of temperature and, thus, the operation of the suspension system is possible at any desired temperature, in particular, the ambient temperature. Accordingly, there is no requirement for continuous cryogenic refrigeration and the power consumption, bulky equipment and maintenance associated with it.

Braunbek's experiments, as described in the above-mentioned article, indicate the possibility of achieving a condition of stable equilibrium in the suspension of a body of diamagnetic material within a highly inhomogeneous magnetic field. The field configuration produced by Braunbek was characterized by decreasing intensity in the vertical direction. When the diamagnetic bodies, which in Braunbek's experiments took the form of tiny bismuth crystals, were placed in the magnetic field, they tended to assume a predetermined position at which the magnetic forces in the vertical direction exactly equalled the gravitational force. Any downward movement from the predetermined position caused the bismuth crystals to encounter a higher magnetic field intensity and, thus, a higher vertical force in the upward direction tending to return the body to the position of equilibrium. Any upward displacement was toward a weaker field intensity, a lesser field radient, and, thus, tended to weaken the supporting force.

In order to produce a suitable magnetic field for the free suspension of the diamagnetic body, Braunbek employed two magnetic poles having the faces thereof parallel and disposed a predetermined distance apart. The field along the magnetic axis of the poles and in the vicinity thereof was substantially uniform. However, due to the flux leakage, or fringing effect, occuring toward the outer extremities of the poles, the desired characteristic of inhomogeneity was produced. In order to provide lateral stability, the uppermost portion of the otherwise round pole was hollowed-out to provide a crescent-shaped cavity in each of the poles.

With this pole configuration, Braunbek was able to successfully suspend small particles which were very light in weight. However, the area of stability was quite narrowly confined such that any displacement of the bismuth crystal beyond a very small amount would result in a loss of stability and a subsequent loss of proper suspension forces for the crystals.

A. H. Boerdijk more recently considered the levitation of diamagnetic bodies in magnetic fields as set forth in Philips Technical Review, volume 18, 1956. Boerdijk repeated Braunbek's experiments but likewise did not develop a field configuration capable of supporting larger bodies with stability in all directions.

It is accordingly an object of the present invention to provide an improved diamagnetic suspension system, including means for producing a magnetic field for supporting in stable equilibrium a diamagnetic body wherein the magnetic field is characterized by high inhomogeneity, thus producing improved stability both vertically and laterally. In general, this is accomplished by the provison of suitably disposed magnetic pole areas defining a magnetic field of high inhomogeneity, in combination with a regularly shaped body of diamagnetic material. More particularly, the invention provides for magnetic polar means to define a magnetic field volume in which the diamagnetic body may be freely supported. The polar means includes a polar area of either a real or apparent nature which constitutes an effective area of flux concentration from which flux lines diverge in a symmetrical pattern about an axis taken normal to the area. Since magnetic pole areas must appear in pairs, flux lines will emanate from the polar area and extend to the opposite pole. In accordance with the present invention these flux lines fashion a magnetic field volume which is characterized by a field intensity which is a maximum at the periphery of the volume and which decrease in intensity toward the center thereof. Also, the field intensity decreases along the axis of symmetry with the distance from the first polar area.

In one specific form, the magnetic field producing means comprises a first magnetic pole having an area smaller than the diamagnetic body, and another magnetic pole opposite in polarity to the first pole and being essentially annular in shape with the diameter thereof greater than the maximum dimension of the diamagnetic body. The poles are relatively disposed to define a substantially conical magnetic field volume in which the diamagnetic body may be supported. In the volume between the two poles, the magnetic lines of force converge toward the smaller pole. Furthermore, in any plane taken normal to the axis of symmetry drawn between the smaller pole and the center of the annular pole, the radial component of the field diminishes rapidly from the periphery of the volume toward the axis of symmetry.

Thus, in an arrangement in which the smaller pole is disposed vertically beneath the annular pole, the requirement for a vertical magnetic field gradient is satisfied such that the gravitational or vertical mass forces on a diamagnetic body suspended within the magnetic field volume may be effectively cancelled. Similarly, a radial or lateral magnetic field gradient is seen to exist due to the fact that the magnetic field intensity at the periphery of the field volume is a relative maximum. Thus, the freely suspended diamagnetic body will be subjected to magnetic forces tending to oppose any forces which would otherwise displace the body from a position of substantial symmetry about the axis of the field volume.

The above-described embodiment of the present invention has been found to effectively suspend the diamagnetic body against both lateral mass forces and vertical gravitational forces. It is contemplated that certain special circumstances may require that the diamagnetic body be freely suspended in stable equilibrium without the aid of gravitational forces to balance the vertical magnetic forces. Additionally, it is contemplated that the subject invention may be employed under circumstances of varying orientation wherein the vertical axis of the magnetic field volume does not maintain a predetermined coincidental orientation with respect to the direction of gravity.

Accordingly, it is another object of the present invention to provide means to suspend a diamagnetic body wherein the magnetic forces provided by the field producing means tend to stabilize the body from displacement due to mass forces in any and every direction. This is accomplished by the provision of a plurality of magnetic pole areas which are arranged in such a manner as to provide a substantially closed magnetic field volume having a relative magnetic intensity minimum at the center thereof. A diamagnetic body, which is disposed in a position substantially symmetrical about the central point of the magnetic field volume, will at this point be in a position of stable equilibrium. A mass force tending to displace the diamagnetic body in any direction will accordingly tend to move the diamagnetic body toward an area of increased flux concentration, and will, therefore, be opposed by a magnetic force tending to maintain the symmetrical position.

The generation of a magnetic field having the desired characteristic of high inhomogeneity normally requires the presence of a concentrated area of extremely high flux density and the accompanying expenditure of large amounts of power. Following the recent discovery of so-called hard superconducting materials, it has become possible to produce intense magnetic fields without dissipating power. Certain intermetallic compounds and alloys, in particular niobium-tin and niobium-zirconium, when cooled to the temperature of liquid helium, exhibit no electrical resistance and remain in this state even when subjected to a magnetic field.

It is, therefore, another object of the present invention to provide a suspension system employing one or more electromagnetic coils of a superconducting nature. This is accomplished by cooling an electromagnetic coil or group of such coils to a proper temperature to attain the superconductive state. Means are provided to establish the desired current flow in the coil or coils, and to disconnect the power source, after which the current will continue to flow, thus producing the magnetic field in accordance with the present invention. It is, therefore, to be understood that while throughout this specification the term magnetic field will be used, this term is intended to embrace a field which is generated by the use of electromagnetic coils of either an ordinary or superconducting nature.

It is a further object of this invention to present a novel instrument for sensing mass or inertial forces as well as changes in the orientation of the diamagnetic body with respect to the surrounding environment. This may be accomplished by the addition of suitable displacement and/or orientation sensing means, which is effective to produce a signal indicative of a change in the displacement or orientation of the diamagnetic body.

It is a further object of this invention to disclose a novel gyroscopic device which through the provision of the diamagnetic suspension means disclosed herein may be employed as a virtually friction-free gyroscope to detect changes in the orientation of a primary body, with respect to the diamagnetic body. This is accomplished by novel means for imparting a rotational movement to the diamagnetic body, thus, defining a spin axis of the body. This spin axis will normally assume a predetermined orientation with respect to the primary body which forms a local frame of reference. Since the spin axis of a freely rotating body tends to maintain its direction in the inertial reference space, any change in the orientation of the local frame of reference will be effective to change the relative orientatio nof the spin axis of the diamagnetic body. This change in orientation may be observed by means of a suitable read-out system, preferably of an optical nature.

These and other objects of the present invention will be more readily understood upon reading the following specifiction which is to be taken with the accompanying figures which are illustrative of various embodiments of the present invention. In the figures:

FIGURE 1 is a partly cross-sectioned view of a preferred magnetic pole configuration which is energized by a suitable electromagnetic coil;

FIGURE 1a is a more detailed view of the pole configuration of FIGURE 1, illustrating the nature of the magnetic field;

FIGURE 2 is a partly broken away view of an alternative embodiment of the present invention employing permanent magnets;

FIGURE 3 is a partly broken away view of one form of the present invention as employed to provide omnidirectional stability of the diamagnetic body;

INTRODUCTION

Figure 4:
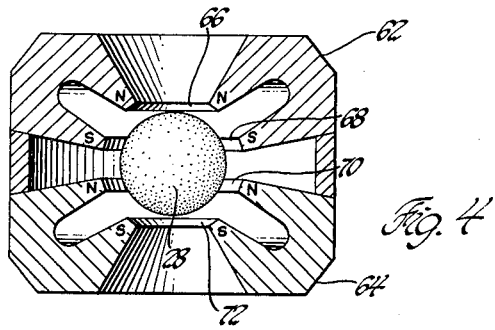
FIGURE 4 is a cross-sectional view of an alternative embodiment of the present invention as employed to provide omnidirection stability.

Briefly describing the present invention, a highly inhomogeneous magnetic field is produced by at least two magnetic poles of opposite polarity. One of the poles is of such a configuration as to define a relatively small area of high flux concentration. The other pole is disposed a distance away from the first pole and the magnetic flux lines existing between the poles are of such a configuration as to define a magnetic field volume which is characterized by a periphery of high field intensity. The poles, and, therefore, the areas of flux concentration, may be produced either by permament magnet means or by electromagnetic means. A regular body, preferably a sphere, of diamagnetic material is suspended in the magnetic field in such a position that any mass force acting on the body would tend to displace it to either an area of flux concentration or toward a flux path of higher concentration than that flux path normally passing through the diamagnetic body. Thus, the mass force is opposed by a magnetic force which tends to maintain the diamagnetic body in a predetermined position of minimum magnetic potential suitable for stable support of the body.

In a specific form, a single pole of either polarity may take the form of an apparent source of flux. It is to be understood that point sources of flux or point poles do not exist in physically realizable form. For example, in a permanent magnet of elongated form, the regions near the extreme ends are generally considered to be the sites of the two opposite poles and, thus, to be sources of magnetic flux. Alternatively, the opposite terminal cross-sectional areas of an electromagnetic coil are sources of magnetic flux and therefore may be considered to be the sites of apparent magnetic poles. Thus, for the purposes of the present invention, it is immaterial as to whether the magnetic poles or areas of flux concentration are defined by magnetic or electromagnetic means. Notwithstanding these physical distinctions, the aforementioned dimensions of the first apparent pole are substantially smaller than the sphere of diamagnetic material which is to be suspended in the magnetic field produced thereby. The second pole or plurality of poles may be continuous as in the case of an annular pole, or discontinuous as in the case of a symmetrical arrangement of point poles, and co-planar with respect to one another, thereby to define a substantially closed figure, the periphery of which is characterized by higher flux concentration than the center thereof. With this arrangement of poles, the overall dimensions of the figure which is defined by the single continuous pole or the plurality of separate poles are made larger than the overall dimensions of the diamagnetic body, whereby the combination of first and second poles defines a magnetic field volume within which the diamagnetic sphere may be disposed. As previously described, the magnetic field volume which is defined by the poles may be either an open or closed volume depending upon the specific application of the magnetic suspension system. For example, if the system is to be subject to the force of gravity, the magnetic field volume may be open in the upward direction whereby the stability of the suspension is maintained with the aid of a gravitational force which is opposed by a magnetic force. In the event that the orientation of the system with respect to the gravitational field is not constant, or that no gravitational forces are expected to exist at all, the magnetic field volume may be of a closed nature to thereby provide a magnetic field distribution which is characterized by a potential minimum at the center and which increases outwardly in all directions toward the periphery of the field volume. This may be readily accomplished by joining the open ends of two or more open field volumes to close the figure.

Where size and power requirements dictate the use of a superconductive coil arrangement to produce the necessary magnetic field, suitable means are provided for surrounding the superconductive coils with a cryogenic refrigerant, such as liquid helium. Additionally, a power source is interconnected with the coil to establish a flow of current therein, and is then disconnected from the coil.

To provide an instrument for sensing mass forces due to the acceleration of the spherical body or changes in the orientation of the spherical body with respect to a reference space, the freely suspended body may have imparted thereto a rotational motion, thus creating a spin axis which tends to maintain a predetermined orientation in space. Having established a predetermined orientation due to the rotational motion and a predetermined position with respect to the surrounding field, a suitable readout system which is compatible with the magnetic field producing means may be incorporated with the system to sense the relative position or orientation of the spherical body.

FIGURES 1 and 1a

Referring now to FIGURES 1 and 1a, there is shown an electromagnetic suspension system comprising a conical pole piece 10 made of highly permeable magnetic material having a high saturation induction such as highly purified iron. Coaxially disposed above the conical pole piece 10 is a second pole piece 12 also made of highly permeable magnetic material. As shown, the pole piece 12 is generally dish-shaped having a central frusto-conical cavity defining an inner surface 14 which is inclined at a predetermined angle from the vertical axis of the pole piece 10. A lower surface 16 of the pole piece 12 is also of a generally frusto-conical shape and is inclined at a second predetermined angle from the vertical which second predetermined angle is greater than the vertical angle of the inner surface 14. The inner and lower surfaces 14 and 16 of the pole piece 12 thus meet to define a circular pole area 18 which is symmetrical about the vertical axis and which lies in a plane normal to the common axes of the pole pieces 10 and 12. The pole pieces 10 and 12 are magnetically interconnected by means of a cup-shaped cylindrical member 20 which serves as a magnetic path of low reluctance completing the magnetic circuit. A cylindrical lower portion 22, which is integral with the conical portion of the pole piece 10, is enclosed by an electromagnetic coil 24 having a predetermined number of turns. The coil 24 is interconnected with a source of electrical energy 26 to produce a current flow in the coil effective to generate a flux field of sufficient intensity to suspend a spherical body 28 of diamagnetic material within the gap defined by the apex of the pole piece 10 and the circular area 18 of the pole piece 12.

The diamagnetic material from which the spherical body 28 is fabricated may be chosen with consideration to such factors as magnetic susceptibility, dimensional stability and electrical conductivity. It is, of course, desirable to use diamagnetic materials of the highest susceptibility, i.e., graphite or bismuth. However, certain inorganic and organic compounds also possess useful diamagnetic susceptibilities, such as silicon dioxide and certain polymers.

Describing the pole configuration of FIGURES 1 and 1a in greater detail, it may be seen that the area intermediate the pole pieces 10 and 12 constitutes the working gap of the magnetic path and also the area of suspension for the diamagnetic body 28. Energization of coil 24 to thus produce the magnetic flux lines 29 in the gap will provide two areas of high flux concentration. These areas are the apex of pole piece 10 and the circular area 18 of pole piece 12. The flux path of highest density between the pole pieces 10 and 12 will thus define a substantially conical volume terminating in an open end coincidental with the circular area 18. The general contour of the magnetic flux field between poles 10 and 12 is more clearly illustrated in FIGURE 1a, from which the body 28 is removed. This figure illustrates the fountain effect or conical shape which is characteristic of the present invention. As will be further described in the following, this conical volume of magnetic flux will be characterized by cross-sections in which the magnetic field intensities are a maximum at the periphery thereof and which decrease toward the axis of the volume.

It has been found that certain reasonably critical dimensional relations must exist in the pole piece configuration of FIGURE 1 in order to provide maximum supporting force for the spherical body 28. The vertical distance between the apex of pole piece 10 and the plane of the circular area 18 is quite critical, inasmuch as it is subject to the conflicting demands for large working space and a strong field which is only obtainable by retaining a small flux gap. It has been found that the optimum gap distance is approximately equal to 1.5 times the radius of the spherical body 28. Therefore, in the normal position of free suspension the spherical body 28 will extend somewhat above the plane of the circular area 18.

Considering the shape of the lower pole piece 10, it has been found that the optimum solid angle between the faces of the conical section may vary between 90° and 120°. It should also be noted that the conical pole piece 10 may be slightly truncated so as to enlarge the working space for the spherical body 28. The geometrical configuration of the lower pole piece 10 would then be more accurately described as frusto-conical. It is to be understood that even if the pole piece 10 is slightly truncated, the remaining circular area of flux concentration is to be dimensionally smaller than the maximum cross-section of the spherical body 28, such that the shape of the conical magnetic field volume remains substantially unchanged.

The upper pole piece 12 may be similarly described in terms of angles with reference to the cross-section of FIGURE 1. The solid angle of the lower surface 16 may vary between 120° and 210°. The solid angle between diametrically opposite points on the inner surface 14 may vary between 90° and 120°. It is to be understood that the angle of the lower surface 16 will always be greater than that of the inner surface 14 in order to provide the circular area 18 as shown in FIGURE 1. Thus, it may be said that the slope of the inner surface 14 is necessarily greater than that of the lower surface 16. Inasmuch as the spherical body 28 must extend vertically beyond the plane of the circular area 18, it is necessary that the diameter of the circular area 18 be greater than that of the spherical body 28 by a predetermined amount. A desirable ratio of the diameters is approximately 5:4.

Considering now in greater detail the particular properties of the magnetic field volume which exists in the working gap between the pole pieces 10 and 12, it has been stated that the relatively small uppermost area of the pole piece 10 and the circular area 18 will be areas of high flux concentration. Substantially straight lines of high flux density will, therefore, exist between the high flux concentration areas to define a substantially conical volume as clearly shown in FIGURE 1a. Due to the fringing effect, that is, the inherent divergence of the magnetic flux between the relatively small area of pole piece 10 and the circular area 18 of pole piece 12, it can be seen that the magnetic intensity decreases very rapidly in the vertically upward direction along the axis of the pole pieces. Thus, the configuration satisfies the requirement for vertical stability by providing a magnetic field having a large gradient in the vertical direction. Since, as previously described, any cross-section of the magnetic field volume taken parallel to the plane of the circular area 18 is characterized by a periphery of high intensity and a decreasing intensity toward the center thereof, it can be seen that a large lateral magnetic gradient also exists. This lateral gradient then satisfies the requirement for lateral or radial stability in the suspension of the diamagnetic body 28.

Applying the previously described principles that a diamagnetic body disposed in an inhomogeneous magnetic field, is subjected to a force tending to move the body toward a decreasing field intensity, it may be seen that the spherical body 28 will be effectively suspended in the working gap of the pole pieces 10 and 12 in a position where the downward gravitational force is effectively balanced by the upward magnetic force. Additionally, the lateral magnetic forces will tend to maintain the spherical body 28 in a position which is substantially symmetrical about the common axis of the pole pieces 10 and 12. A vertically downward displacement of the body 28 will cause the body 28 to encounter the increasing intensity at the apex of pole piece 10. Thus, an increasing upward magnetic force tends to move the body back toward the equilibrium point. A lateral displacement will cause the body 28 to encounter the increasing intensity of the periphery of the magnetic field volume and will thus produce a radial restoring force.

*FIGURE 2*

Referring now to FIGURE 2, there is shown an arrangement of permanent magnets effective to establish a magnetic field in accordance with the present invention between upper and lower pole pieces 30 and 32 respectively. In a manner similar to the arrangement shown in FIGURE 1, the lower pole piece 32 consists of a body of highly permeable magnetic having a frusto-conical section 34 suitably formed on the upper portion of a cylindrical body section 36. The frusto-conical section 34 of pole piece 32 is terminated at the uppermost extremity by a slightly concave cavity 38 which defines a circular pole area 40 lying in a plane normal to the axis of the pole piece 32. Surrounding the cylindrical section of the pole piece 32 and magnetically interconnected therewith are a plurality of permanent bar magnets 42 which are radially disposed with the south pole thereof adjacent the pole piece 32. This configuration of permanent magnets is effective to establish the pole piece 32 as a south pole.

The upper pole piece 30 comprises a substantially cylindrical portion 43 having formed on the lower end thereof a frusto-conical section 44, the lowermost end plane of which is parallel to the circular area 40 of the lower pole piece 32. Extending axially through the upper pole piece 30 is a frusto-conical cavity 46 defining an inner surface 48 of the upper pole piece 30. The inner surface 48 has a slope which is greater than that of the outer surface of the frusto-conical portion 44, thus defining an annular area 50 at the lowermost portion of the pole piece 30. The annular area 50 lies in a plane which is parallel to the plane of the circular area 40 of the lower pole piece 32. Extending radially outward from and magnetically interconnected with the upper pole piece 30 are a second plurality of permanent bar magnets 51, having the north poles thereof adjacent the pole piece 30 to thus establish the pole piece 30 as a north pole. The upper pole piece 30 is maintained in a position which is coaxial with and a predetermined distance above the lower pole piece 32 by means of a hollow cylindrical iron member 52 of very low reluctance. The cylindrical member 52 is permanently attached to the magnets 42 and 51 and also serves to complete the magnetic path therebetween. This configuration establishes a magnetic working gap between the pole pieces 30 and 32. In the drawing there is shown a spherical diamagnetic body 28 disposed in the working gap between the pole pieces 30 and 32.

In accordance with the present invention, the geometrical configuration of magnetic poles energized as shown in FIGURE 2 will be effective to produce two areas of high flux concentration. The first of these high flux concentration areas corresponds with the circular area 40 of the lower pole piece 32 which is defined by the concave cavity 38. The second of these areas of high flux concentration corresponds with the annular area 50 defined by the intersection of the inner surface 48 and the lower surface of the frusto-conical section 44 of the upper pole piece 30. Flux lines extending between the areas of high flux concentration of the pole pieces 30 and 32 will, therefore, define a substantially conical or, more specifically, frusto-conical magnetic field volume.

As indicated in the drawing of FIGURE 2, the diametric dimension of the circular flux concentration area 40 is substantially smaller than the diameter of the spherical body 28, while the inner diameter of the annular flux concentration area 50 of the upper pole piece 30 is larger than that of the spherical body 28. In accordance with the description given with respect to FIGURE 1, the cross-sections of the magnetic field volume defined by the circular areas of flux concentration taken in a plane parallel with the areas 40 and 50 will be characterized by a periphery of high magnetic intensity with a decreasing intensity toward the center of the section. Considering the axial field distribution, it may again be seen that the vertical intensity gradient exists along the common axis of the pole pieces 30 and 32 with a rapidly decreasing intensity in the upward direction. Therefore, an effective balancing of the gravitational and magnetic forces will suspend the diamagnetic body 28 in a state of stable equilibrium in a position intermediate the pole pieces 30 and 32. The radial magnetic gradient also is effective to maintain the body 28 in a position which is symmetrical about the common axis of the pole pieces 30 and 32.

It will be understood by those skilled in the art that the particular means shown in FIGURE 2 to accomplish the inventive concept of this invention are only illustrative, and that the improved field configuration may be established by a number of methods. For example, the annular polar area 50 of the upper pole piece 30 may be adequately approximated by a suitable arrangement of discrete poles of a real or apparent nature. Further elaboration on this point is taken up in the following.

FIGURE 3

The preceding description, with reference to FIGURES 1 and 2, described suitable arrangements for providing a magnetic field which compensates for the gravitational effect on a diamagnetic body. However, it is contemplated that the specific environment of the present invention may dictate the need for field configuration which will be suitable for the support of a diamagnetic body in the absence of a gravitational field. A substantially similar problem would arise if it were not possible to dispose the apparent magnetic poles of FIGURES 1 and 2 such that the common axis thereof was parallel with the force of gravity. Accordingly, the apparatus of FIGURE 3 is illustrative of one way to establish a magnetic field having a spatially symmetrical gradient wherein the intensity increases in all directions from a central point. This field is established by a plurality of permanent north and south poles 54a–h having generally conical shapes and being symmetrically arranged about a central point such that the apices of the poles 54a–h define a regular polyhedron. The particular arrangement of FIGURE 3 suggests the use of eight poles 54a–h defining an apparent cubical volume 56 within which exists a magnetic field of high inhomogeneity. To define the cubical volume 56, two north poles 54a and 54b and two south poles 54c and 54d are permanently fixed to a first hemispherical member 58 which forms a low reluctance flux path between the poles. Similarly, two north poles 54e, 54f and two south poles 54g, 54h are fixed to a second hemispherical member 60 which also forms a low reluctance flux path between the poles. The hemispherical members 58 and 60 are concentrically disposed about a central point which, by virtue of the pole arrangement, assumes a minimum magnetic potential. It will be noted that the magnetic poles 54 are arranged such that any square face of the cubical volume 56 is defined by two opposite polarity pole pairs with the like polarity poles diagonally opposite.

Considering the arrangement of the eight poles 54a–h, it may be seen that lines of maximum flux density exist between any selected pair of opposite polarity poles. Due to the flux divergence, the flux density, and, therefore, the magnetic potential, decreases with the distance from a straight line drawn between a selected pair of poles in a direction toward the center of the cubical volume 56. In order to visualize the direction of the magnetic force, consider a planar area defined by the three north poles 54b, e, f. which are one cube edge away from the lowermost south pole 54h as shown in the drawing, is characterized by a discontinuous periphery of high flux density and a decreasing density toward the center of the planar area. Similarly, the flux density and, thus, the magnetic field intensity is seen to increase from the center of the above-defined planar area along a line toward the lowermost south pole 54h. In the absence of the remaining four poles 54a, c, d, g, the centrally disposed spherical body 28 would be supported against a force tending to move the body toward the pole 54g by the inhomogeneous field volume which exists between the poles 54b, e, f, h. By adding the four poles 54a, c, d, g, to define a regular cube, it may be seen that any combination of three like polarity poles which are equidistant from an opposite polarity pole may be analyzed in a manner similar to that shown above. Thus, omnidirectional stability is provided.

The octopole arrangement of FIGURE 3 has been shown to provide a magnetic field volume of regular geometric configuration characterized by a central point of minimum field potential from which the magnetic field intensity increases in all directions. According to the fundamental principles described earlier in this specificaton, it may be seen that the spherical body 28 experiences equal magnetic forces thereon from all directions tending to maintain the body symmetrically disposed about the aforementioned central point of minimum potential. A mass force, such as gravity or acceleration tending to displace the body 28 from the central position, will be accordingly opposed by a magnetic force tending to maintain the predetermined position of symmetry. This force will be proportional to the product of the displacement of the body 28, the diamagnetic susceptibility thereof and the square of the magnetic field gradient encountered. Since the gradient is expressed in terms of field intensity divided by distance, the relative size of the spherical body 28 and that of the cubical volume defined by the pole 54 is critical in determining the magnitude of the restoring force. It has been found that the optimum ratio of the diameter of the body 28 to the distance between diametrically opposed poles is 2:3.

It is, of course, possible to use more than eight poles to support the spherical diamagnetic body 28 in a magnetic field. However, the greatest even number of poles that can be regularly disposed about the center of symmetry is 12, since it is known from geometry that the regular dodecahedron is the highest possible regular solid. If still greater number of poles is desired to improve the magnetic gradient, various arrangements of poles in symmetric clusters and zones are possible. This suggests that it may be possible to symmetrically dispose a greater number of poles in closer relation so as to better approximate a continuous area of flux concentration as previously described with reference to FIGURES 1 and 2.

FIGURE 4

In accordance with the zonal concept introduced immediately above, it has been found to be possible to define a magnetic field volume of high inhomogeneity which is characterized by a central point of minimum magnetic potential from which the magnetic intensity increases in all directions. Such a field configuration may be provided by an arrangement of coaxial, circular continuous magnetic poles of varying diameter symmetrically disposed about a central point with the adjacent poles being of opposite polarity. Such a field configuration may be realized by the arrangement shown in FIGURE 4. In this figure there are shown two similar annular permanent magnets 62 and 64. As indicated in the drawings, the cross-sections of the annular magnets 62 and 64 are substantially U-shaped to form two circular parallel pole areas on each of the magnets 62 and 64. These circular pole areas are then symmetrically arranged about a central point which coincides with the center of a spherical diamagnetic body 28 which is suspended within the magnetic field provided by the magnets 62 and 64.

More specifically, permanent magnet 62 provides a substantially circular north pole 66 having a diameter which is somewhat smaller than the diameter of the spherical body 28. Magnet 62 also provides a circular south pole 68 which lies on a plane which is parallel to but axially spaced from the plane of the north pole 66 and is coaxial therewith. The diameter of the circular south pole 68 is substantially greater than that of the spherical body 28. Similarly, the permanent magnet 64 forms a circular north pole 70 having a diameter equal to that of the south pole 68, and a second south pole 72 having a diameter equal to that of the north pole 66. A nonmagnetic spacer 74 is disposed intermediate the magnets 62 and 64 to maintain the magnetic field symmetry about the center of the magnetic field volume which is defined by the circular poles 66, 68, 70 and 72.

An analysis of the magnetic flux distribution between the poles 70 and 72 of magnet 64 indicates the similarity between the magnetic field produced by this configuration and that of the magnetic field produced by the polar arrangement of FIGURES 1 and 2. That is, poles 70 and 72 represent areas of concentrated magnetic flux and lines drawn between the circular polar areas define a frusto-conical magnetic field volume wherein a cross-section taken parallel to the planes of the circular poles is characterized by a magnetic field having a maximum intensity at the periphery and which decreases toward the center of the section. Therefore, it may be seen that the magnetic flux intensity decreases along the common axis of the poles 70 and 72 in an upward direction as shown in the drawings from the center of pole 72. Thus, the spherical body 28 will experience an upward force tending to move it in the direction of a decreasing field intensity.

Lateral stability is also provided as previously described with reference to FIGURES 1 through 3. That is, lateral displacement of body 28 toward the high intensity periphery of the field volume produces a force unbalance across the volume of the spherical body 28 tending to return it to a position of symmetry about the axis of magnet 64.

It can be seen that the frusto-conical field volume produced by magnet 64 is effectively open on the upper end since the diameter of the pole 70 is greater than that of the body 28. Thus, it is theoretically possible, in the absence of a balancing gravitational field or other mass force on the body 28, for the body 28 to be indefinitely displaced axially through and beyond the open end of the field volume defined by the present invention. Such a displacement is in the direction of a decreasing field intensity which extends to infinity along the axis of the field volume.

To preclude the possibility of such an indefinite displacement, the upper permanent magnet 62 shown in FIGURE 4, is disposed substantially vertically above the spherical body 28 to provide a downward force in precisely the same manner as the magnet 64 provides an upward force. This combination effectively closes the magnetic field volume by joining the open ends of two or more open field volumes. If the field strengths provided by the two magnets 62 and 64 are precisely the same, the spherical body 28, in the absence of a mass force such as gravity, tends to assume a normal position which is intermediate the magnets 62 and 64. Is should also be noted that the provision of two such magnets greatly enhances the lateral stability of the spherical body 28 since magnetic forces radially inward toward the center of the field volume provided by the circular pole areas are acting upon the body 28 from both of the magnets 62 and 64. Thus, the spherical body 28 tends to maintain the position of symmetry about the central point of the magnetic volume irrespective of the orientation of the magnets 62 and 64 of the direction of any mass force acting upon the body 28.

It is apparent that a greater number of circular pole areas may be provided than that shown in the example of FIGURE 4. Additionally, the magnets 62 and 64 may be constructed of magnetically soft material and the circular pole area established by electromagnetic coils disposed in the annular areas inside of the U-shaped cross-section.

FIGURE 5

The zonal concept which was described with reference to FIGURE 4 suggests that the magnetic field configuration suitable for the stable suspension of a spherical diamagnetic body may be provided either with permanent magnets or electromagnetically. In accordance with the present invention, it is also possible to produce the proper magnetic field configuration with one or more electromagnetic coils without the use of iron in the flux path. For example, consider the magnetic flux distribution in the area immediately adjacent the end of a solenoid suitably energized with electric current. It is well known that the magnetic flux lines emerge from the inside of the solenoid substantially along the direction of the axis, but gradually diverge from it in the radial direction. Also, considering a planar area parallel to the end of the solenoid and spaced therefrom, it may be seen that, because of the divergence, the flux density in the axial direction is a relative minimum at the point where the axis of the solenoid intersects the plane, and that the flux density increases with the radial distance from this center point. Considering the flux density along a line drawn radially outward in the plane, it will further be seen that the magnetic flux density increases to a maximum value and then decreases with further distance from the axis of the solenoid. Thus, it may be said that there exists an annular area of high flux concentration in a plane normal to the axis of the solenoid and spaced a predetermined distance from the end thereof. Thus, the field contained within the volume near the extremity of the coil is similar in its distribution to that produced by the combination of magnet poles described above in connection with the FIGURES 1 and 2. Since this magnetic field volume is symmetrical about the axis of the solenoid, it can further be seen that a spherical diamagnetic body may be freely suspended within the magnetic field volume against the action of gravity or mass forces. If the center of the spherical diamagnetic body is located at the intersection of the axis of a solenoid and a plane located a predetermined distance from the end of the solenoid, it can be seen that any displacement of the body toward the center of the solenoid along the axis thereof will tend to move the body toward an area of higher flux concentration and, therefore, of higher magnetic intensity. Provided the diameter of the spherical body is smaller than the diameter of the second annular pole area defined above, it can be seen that any radial force tending to displace the diamagnetic body from the position of symmetry about the axis of the solenoid will also be a displacement in the direction of an increasing magnetic intensity. In accordance with the fundamental theory that that diamagnetic body experiences a force tending to move it in the direction of decreasing magnetic intensity, it is apparent that the spherical diamagnetic body will tend to assume a central position of stable equilibrium adjacent the end of the solenoid.

From the foregoing description, it will be perceived that the magnetic field volume defined by a single magnetic coil is effectively open; that is, the condition of stable equilibrium is dependent upon the presence of some mass force, such as gravity. This magnetic field volume may be effectively closed by the combination of a plurality of electromagnetic coils arranged to effectively join the open ends of the respective magnetic field volumes generated thereby. With such an arrangement, the stable equilibrium of the spherical diamagnetical body disposed within the closed magnetic volume is independent of mass forces such as gravity, and is also independent of the orientation of the surrounding field coils.

The use of electromagnetic coils to produce the magnetic suspension field has several definite advantages over a field produced by permanent magnets. One advantage is that the relative strength of the field may be varied. Another, and perhaps more important advantage, is the fact that the electromagnetic coil may be composed of a superconducting material such as niobium-tin or niobium-zirconium in the form of hard drawn wires or rolled bands. Thus, through the use of a cryogenic refrigeration system, the electrical resistance of the coil may be reduced to zero. The result is that once a desired current flow is established in the superconducting coil, the source of power may be disconnected and the super current will continue to flow in the coil and to produce the magnetic suspension field.

Figure 5:
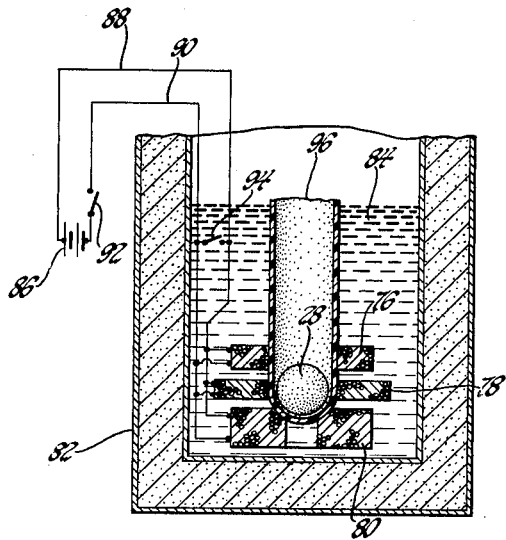
FIGURE 5 is a cross-sectional view of the present invention as applied to an arrangement of superconducting coils; and, FIGURE 6 is a cross-sectional view of a gyroscopic instrument employing the present invention.

The use of a cryogenically refrigerated superconducting coil in accordance with the present invention is illustrated in FIGURE 5. This figure shows a spherical body 28 of diamagnetic material freely suspended in the inhomogeneous magnetic field provided by a parallel and coaxial arrangement of electromagnetic coils 76, 78 and 80. The coils are disposed within a cylindrical insulating vessel 82 which contains a suitable cryogenic bath 84 such as liquid helium. The temperature of liquid helium, 4° K., is well below the transition temperature, approximately 10° K., of a superconducting material as named above. The vessel 82 is of highly efficient thermal insulating nature and may be of a double-wall, vacuum type with the vacuum space filled with a fine powder of silica or pearlite. To establish the flow of current in the coils 76, 78 and 80, a source of electrical energy such as a battery 86 is interconnected with the coils by means of conductors 88 and 90. A series switch 92 is effective to complete the current path from the battery 86 to the coils. Once the supercurrent flows in the coils, a superconducting shunt switch 94 may be closed to short out the battery 86. Disposed within the cryogenic bath 84 and extending into the interior of the coils 76, 78 and 80 is a tubular chamber 96 which may be evacuated by means not shown. The evacuated chamber 96 is composed of a material which is virtually transparent to the electromagnetic field produced by the coil arrangement. The diamagnetic body 28 may or may not be at the same temperature as the electromagnetic coils since the diamagnetic susceptibility is essentially independent of temperature.

Considering the magnetic field produced by the coils 76, 78 and 80 in greater detail, as suggested in the drawings, the coil 78 is composed of fewer turns than either of the coils 76 or 80. Thus, considering only the axial components of flux, the magnetic intensity at the center of coil 78 is less than the intensity at the center of either coils 76 or 80. This condition is necessary to produce a vertical magnetic gradient wherein the magnetic field intensity increases both vertically upward and downward from the center of coil 78. Therefore, the spherical body 28 will assume a position which is substantially symmetrical about the point of minimum potential with respect to the vertical axis. As previously described, the fringing effect or flux divergence of a coil, the diameter of which is greater than the length, is very pronounced in the area immediately adjacent the end of the coil. Thus, the magnetic flux emanating from the interior end of coil 80 will rapidly diverge radially as will the flux lines emanating from the interior end of coil 76. These diverging flux lines from coils 76 and 80 are effectively superimposed with the interior flux of coil 78 such that the field intensity at a point radially outward from the center of coil 78 is substantially greater than the intensity at the center of coil 78. This flux superimposition creates a field gradient characterized by increasing intensity in all directions from the center of coil 78. It is to be noted that the magnetic field volume which is defined by the interior of coils 76, 78 and 80 substantially corresponds with the flux volume which is generated by the permanent magnet configuration of FIGURE 4. Referring briefly to FIGURE 4, it is seen that the coils 76, 78 and 80 of FIGURE 5 may be placed within the annular spaces of the permanent magnets of FIGURE 4 to define a closed magnetic flux volume in accordance with the present invention. The correspondence between the permanent magnet arrangement of FIGURE 4 and the electromagnetic coil arrangement of FIGURE 5 is demonstrative of the feasibility of producing equivalent magnetic field configurations with either permanent or electromagnetic means.

FIGURE 6

Having now described various methods for freely suspending in stable equilibrium a diamagnetic body either with or without the presence of mass forces such as gravity, a number of novel and useful embodiments employing the present invention will be described.

The magnetic means which produce the suspending field may be said to be interconnected with a primary body which may be subjected to conditions of varying orientation or mass forces. As has been described herein, the spherical diamagnetic body 28 is maintained in a fixed position with respect to the surrounding magnetic field when external forces are constant, and, therefore, in a fixed position with respect to the primary body. If the primary body is subjected to mass forces due to acceleration, there will be an inertial force tending to displace the diamagnetic body from the fixed relative position. As has been shown, this force will be opposed by a magnetic force tending to maintain the fixed position. This force has been shown to be directly dependent upon the magnitude of the displacement. Therefore, with the incorporation of suitable displacement readout means such as an optical system as will be described herein, the present invention may be used as a simple and highly effective accelerometer. When used as an accelerometer, a mass force on the spherical body will tend to displace it away from the point of minimum potential in the magnetic field until the mass force is effectively opposed by a magnetic force which tends to maintain the spherical body in a predetermined point of minimum potential. By optical or electro-optical means it is possible to detect the degree of displacement and, thus, give an accurate indication of the acceleration forces on the primary body.

Figure 6:
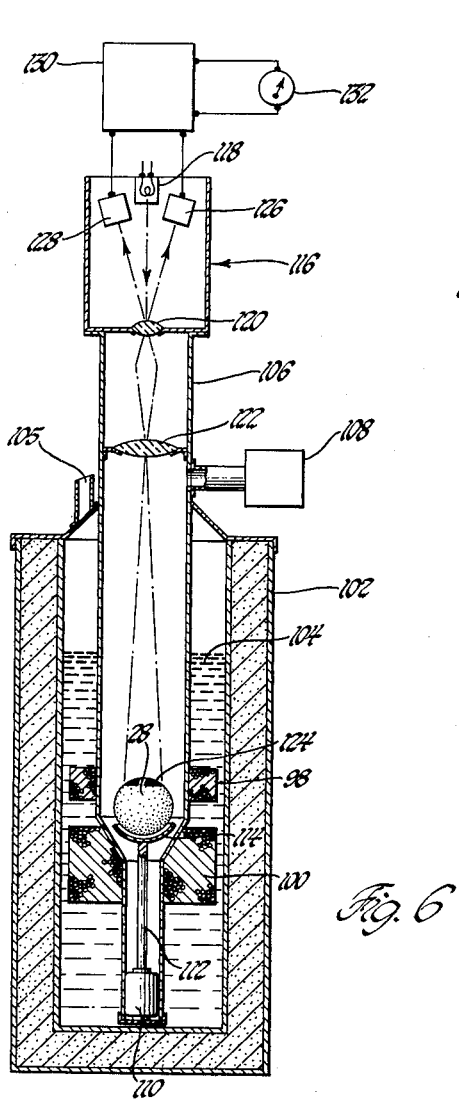

In accordance with the illustrative embodiment of FIGURE 6, it is also indicated how the concept of the present invention may be adapted to a gyroscopic device for measuring changes in the displacement of the primary body with respect to an inertial space. Having suspended the spherical diamagnetic body in an evacuated enclosure as shown in FIGURE 5, it is apparent that if an initial rotational motion is imparted to the spherical body, it will be virtually free from friction forces tending to diminish the rotatonal motion. The rotational motion of the spherical body will define a spin axis which tends to maintain a predetermined orientation in the reference space and, therefore, any changes in the orientation of the primary body to which the magnetic producing means are attached will show up as a relative change in the orientation of the spherical body with respect to the magnetic field axis.

It has been stated that the material from which the diamagnetic body 28 is constructed will be chosen with consideration to such factors as dimensional stability, magnetic susceptibility and electrical conductivity. When used as a gyroscope rotor, the spherical body 28 must maintain precise symmetry about the spin axis in order to avoid any undesirable inertial force components tending to disturb the spin axis. Also since the spherical body may be subjected to substantial temperature changes, its temperature coefficient of expansion must be very low. There is a definite advantage in using an electrically non-conducting material for the construction of the spherical rotor. A non-conducting material will not have induced therein eddy current as it rotates in the supporting magnetic field. Such eddy currents would not only slow down the rotation but would also produce perturbing torques. It is possible to greatly reduce the effect of eddy currents and still use an electrically coducting diamagnetic material such as graphite. This is accomplished by suddividing the highly diamagnetic graphite into fine particles and coating them with a suitable insulating material, which also serves as a binder. A composite material of this type is electrically non-conducting over the whole thereof, and the eddy currents are confined to individual particles. It is highly desirable to use a strongly diamagnetic material, such as graphite, since the use of other weakly diamagnetic but otherwise desirable materials, such as glass, require the generation of very strong fields in order to produce the high gradients necessary for sufficiently strong supporting forces.

The arrangement of FIGURE 6 is illustrative of a means for applying the present invention to a free-spinning diamagnetic gyroscope. In this system, the spherical diamagnetic body 28 is freely suspended in a magnetic field volume produced by two superconducting coils 98 and 100. The superconducting coil 100 is effective to produce the magnetic field volume of substantially conical shape wherein the cross-sections are characterized by a field intensity which decreases from the periphery toward the center of the section. Coil 98 is effective to produce a somewhat weaker magnetic field which closes the field volume on the upper end. The system of FIGURE 6 contemplates primary use in an upright position such that the gravitational force exerted on the spherical body 28 acts downwardly along the axis of coils 98 and 100. This accounts for the fact that coil 100 has a substantially greater number of turns than does coil 98.

The superconducting coils are disposed within an insulating vessel 102 which contains a cryogenic bath 104 which, as previously stated, may be liquid helium. Lead wires for interconnecting a source of electrical energy with the superconducting coils 98 and 100 may be brought in through the area generally indicated at 105. As discussed with reference to FIGURE 5, this source of electrical energy need only be temporarily connected to the superconducting coils to establish the flow of current therein. Disposed within the vessel 102 and extending through the central opening of coils 98 and 100 is an enclosing member 106 which provides an air-tight chamber within the cryogenic refrigeration means. The enclosing member 106 may be evacuated by a pump 108. Also disposed within the member 106 is a means for imparting an initial rotation to the spherical body 28. This means comprises a small motor 110 which is located at the bottom of the enclosing member 106 as shown in the drawing. Connected to the rotor of the motor 110 is a shaft 112 which extends along the axis of coil 100 upwardly into the magnetic field area. Connected to the upper end of the shaft 112 and rotatable therewith is a cup-shaped member 114 which is adapted to receive the spherical body 28 in frictional engagement therewith. The cup-shaped member 114 is located a small distance below the normal position assumed by the spherical body 28 when acted upon by the magnetic forces produced by coils 98 and 100. The rotary motion of the cup-shaped member 114 due to the action of the motor 110 is effective to establish a spin axis of the spherical body 28. This spin axis coincides with the axis of the coils 98 and 100 so long as the orientation of the vessel 102 does not change after the spherical body 28 is freely suspended out of contact with the cup-shaped member 114.

In the embodiment shown in FIGURE 6, energization of the coils 98 and 100 lifts diamagnetic sphere 28 upwardly from the spinning member 114 into a position of free suspension. It is to be understood that the cup-shaped member 114 may be withdrawn from the spherical body 28 with the results being substantially the same.

FIGURE 6 shows an optical system generally designated at 116 which may be used to detect changes in the orientation of the spin axis of the spherical body 28 with respect to the surrounding members. This optical readout apparatus 116 comprises a light source 118 and a system of lenses comprising coaxially spaced lenses 120 and 122 which are effective to direct a light beam from the source 118 onto the top portion of the spherical body 28. The top portion of the spherical body 28 is made a dark non-reflective color relative to the rest of the sphere over an area which exactly coincides with the area of the spherical surface which is covered by the light beam from source 118. Disposed about the light source 118 is a system of photocells 126 and 128 which are adapted to produce output signals related to the amount of light incident upon the photocells. These photocells 126 and 128 are electrically connected to a meter 130 which is adapted to produce a reading on a dial face 132 which is dependent upon the relative distribution of light between the protocells 126 and 128.

Considering now the operation of the system shown in FIGURE 6, while the coils 98 and 100 are de-energized, the spherical body 28 will rest in the cup-shaped member 114 due to the force of gravity acting on the spherical body. When the motor 110 is turned on, the cup-shaped member 114 is rotated, thus, imparting a spinning motion to the spherical body 28. This spinning motion defines a spin axis which is coincidental with the axis of the shaft 112 and also the common axis of coils 98 and 100. Upon energizing the coils 98 and 100 from a source not shown, the spherical body is levitated upwardly out of contact from the cup-shaped member 114 and into free suspension within the evacuated chamber defined by member 106. Motor 110 may then be de-energized and the spherical body 28 will continue to rotate about the spin axis.

So long as no changes occur in the initial orientation of the insulating member 102 and the coils 98 and 100 which are positioned therein, there will be no change in the orientation of the spin axis of body 28, relative to its original position. Thus, the light beam from source 118, which is focused by lenses 120 and 122 onto the darkened portion 124 of the spherical body 28 will remain coincident with the darkened portion 124. Thus, the balanced system of photocells 126 and 128 will receive very small but equal amounts of light such that the signals sent to meter 130 will indicate no change in the orientation of the spin axis of the spherical body 28 with respect to the remainder of the system. However, should the orientation of the primary body, which it will be assumed is bearing the gyroscopic system of FIGURE 6, change so as to produce a relative change in the orientation of the spin axis of the spherical body 28, the beam from light sources 118 will no longer be entirely coincidental with the darkened portion 124, but will fall on a crescent-shaped area of reflectivity. This reflectivity will reflect light back to the cells 126 and 128 in unequal amounts. This reflection unbalance will, thus, produce unequal signals which will be transferred to meter 130. The meter 130 may then produce an indication of the non-correspondence between the spin axis of body 28 and the coil axis.

It is to be understood that the gyroscopic embodiment of FIGURE 6 is merely illustrative rather than definitive of the present invention. Further modifications of this system are possible as will be apparent to those skilled in the art. For example, rather than merely providing an indication of the change in the orientation of the primary body, it may be desirable to incorporate a servo system which is responsive to the error signal to bring about a change in the relative orientation of the primary body so as to maintain a predetermined orientation. Additionally, it is to be understood that a greater number of photocells than two will be employed to sense relative orientation changes in more than one plane.

As indicated above, further modifications and changes as well as additional areas of application of the present invention will become apparent to those skilled in the art. Therefore, while the embodiments disclosed herein are illustrative of the present invention, they are not to be construed in a limiting sense. For a definition of the invention, reference should be had to the appended claims.

What is claimed is:

1. A diamagnetic suspension apparatus including: a body of diamagnetic material; an inhomogeneous magnetic field volume which is symmetrical about the longitudinal axis thereof, the field intensity within the volume increasing rapidly with the radial distance from the longitudinal axis, the field intensity also increasing rapidly with the distance along the longitudinal axis in a predetermined direction, the diamagnetic body being normally freely suspended within the volume in a position which is substantially symmetrical about the axis.

2. Diamagnetic suspension apparatus including: a body of diamagnetic material; an inhomogeneous field volume having a vertical axis of symmetry, the field intensity within the volume increasing rapidly with the radial distance from the axis, the field intensity also increasing downwardly along the vertical axis; the body being normally disposed within the field volume in a position which is substantially symmetrical about the vertical axis.

3. Diamagnetic suspension apparatus comprising a body of diamagnetic material; means to define a magnetic field volume, the means including an area of high magnetic flux concentration from which flux lines diverge symmetrically about an axis taken normal to the area, whereby the magnetic field intensity decreases rapidly with the distance along the axis from the area, and increases rapidly with the radial distance from the axis; the body being normally disposed within the volume in a position which is substantially symmetrical about the axis.

4. Diamagnetic suspension apparatus including: a diamagnetic body; first means to define an area of high flux concentration of one polarity, second means to define a substantially annular area of high flux concentration of the opposite polarity, the diameter of the annular area being greater than the maximum dimension of the area of said one polarity, whereby the first and second means define a magnetic field volume having an axis of symmetry taken through the areas, the field intensity in the volume increasing with the radial distance from the axis and the axial distance from the annular area toward the area of staid one polarity; the diamagnetic body being normally disposed within the volume in a position which is substantially symmetrical about the axis.

5. Diamagnetic suspension apparatus comprising the combination of; a spherical diamagnetic body of predetermined dimensions, means to produce a magnetic field for supporting the spherical body in stable equilibrium comprising a first magnetic pole area having an effective area much smaller than the maximum cross-sectional area of the diamagnetic body, a second magnetic pole area of substantially circular shape and having a diameter larger than that of the diamagnetic body, the first and second poles being of opposite polarity and coaxially displaced a predetermined distance apart thereby to define an inhomogeneous magnetic field of substantially conical shape, the cross-sections of the conical field being characterized by a field intensity which decreases rapidly from the periphery toward the center of the sections, the conical magnetic field being adapted to accommodate the diamagnetic body in a predetermined position intermediate the first and second poles, the predetermined position being symmetrical about the axis of the magnetic field.

6. A diamagnetic suspension system including: a spherical body of diamagnetic material having a predetermined diameter, a first circular magnetic pole having a diameter substantially smaller than the predetermined diameter, a second circular magnetic pole having a diameter larger than the predetermined diameter, the first and second poles being of opposite polarity and coaxially disposed a predetermined distance apart thereby to define a substantially frusto-conical magnetic field volume of high inhomogeneity, the cross-sections of the field being characterized by a field intensity which decreases rapidly from the periphery toward the center of the sections, the spherical body being normally disposed substantially within the field volume whereby the magnetic forces on the spherical body tend to displace the body away from the first pole while maintaining a coaxial disposition with respect to the magnetic field volume.

7. A diamagnetic suspension system comprising the combination of; a spherical body of diamagnetic material, a first annular magnetic pole having an outer diameter substantially smaller than that of the spherical body, a second annular magnetic pole opposite in polarity to the first pole and having an inner diameter larger than that of the spherical body, the second magnetic pole being coaxial with the first pole and vertically displaced a predetermined distance above the first pole thereby to produce a frusto-conical magnetic field volume of high inhomogeneity, the cross-sections, of the volume being characterized by a field intensity which decreases rapidly from the periphery toward the center of the sections, the spherical body being freely suspended within the magnetic field volume in a position symmetrical about the axis thereof whereby the magnetic field exerts a force on the body opposite in direction to the gravitational force exerted in the body thereby tending to maintain the body in a predetermined normal position with respect to the magnetic field volume.

8. Diamagnetic suspension means including a spherical body of diamagnetic material, a first annular magnetic pole having an outer diameter smaller than the diameter of the spherical body, second and third annular magnetic poles each having an inner diameter larger than that of the spherical body, a fourth annular magnetic pole having an outer diameter smaller than that of the spherical body, the second and third annular poles being coaxial with and disposed intermediate the first and fourth annular poles to thereby define a substantially spherical volume wherein the first through fourth poles define successively spaced parallel circles on the spherical volume, the poles being axially arranged in alternately opposite polarity thereby to produce two substantially frustoconical magnetic fields within the spherical volume wherein the point of minimum intensity occurs at a point substantially central of the spherical volume, the spherical body being disposed within the spherical volume whereby the magnetic forces produced by the magnetic poles tend to maintain the spherical body in a position which is symmetrical about the central point of minimum intensity.

9. A diamagnetic suspension system comprising the combination of a plurality of magnetic pole areas, the pole areas being symmetrically arranged about a central point to define a regular polyhedron of predetermined inner dimensions wherein the faces of the polyhedron are defined by magnetic poles of alternately opposite polarity whereby the intensity of the magnetic field produced within the polyhedron increases rapidly in all directions from the central point, a solid spherical body of diamagnetic material having a diameter less than the predetermined dimensions of the polyhedron, the spherical body being disposed within the polyhedron whereby the magnetic forces exerted on the body tend to maintain the body in a position which is symmetrical about the central point.

10. A diamagnetic suspension system comprising a spherical body of diamagnetic material, a plurality of electromagnetic coils adapted to produce respective magnetic fields in accordance with the currents flowing therein, a source of electrical energy interconnected with the coils, the plurality of coils being coaxially arranged with predetermined spacing therebetween to define a magnetic field volume of high inhomogeneity about a predetermined point on the axis of the coils, the field intensity at the predetermined point being a relative minimum within the volume, the spherical body being normally disposed in a position corresponding with the predetermined point.

11. A diamagnetic suspension system comprising a spherical body of diamagnetic material, at least one electromagnetic coil adapted to produce a magnetic field in accordance with the flow of current therethrough, a source of electrical energy interconnected with the coil, the axis of the coil being vertically disposed whereby the flux distribution adjacent one end of the coil defines a magnetic field volume of substantially conical shape wherein the field intensity within a plane normal to the axis of the volume decreases from the periphery to the intersection of the plane and the axis, the spherical body being normally disposed within the field volume in a position which is symmetrical about the axis of the volume.

12. Apparatus as defined by claim 11 wherein the coil is constructed of superconductive material; the combination including cryogenic refrigeration means to maintain the coil in a superconductive state, and means for providing a circuit through the coil shunting the source when the desired current flows in the coil.

13. Apparatus for producing a magnetic field for supporting in stable equilibrium a spherical diamagnetic body including: a first magnetic pole comprising a conical body of magnetic material having the axis thereof vertically disposed; a second magnetic pole comprising a frusto-conical body of magnetic material, the body having a central frusto-conical cavity defining an inner surface of the body, the angle between the axis of the body and the inner surface being smaller than the angle between the axis and the outer surface whereby the intersection of the inner and outer surfaces defines a circle of predetermined diameter; the predetermined diameter being larger than the diameter of the spherical body; the first and second poles being of opposite polarity, the second pole being vertically disposed above and spaced from the first pole such that the circle confronts and is coaxial with the apex of the first pole thereby to produce a substantially cone-shaped magnetic field volume of high inhomogeneity wherein the field intensity decreases from the periphery of the volume toward the axis thereof, the spherical body being normally disposed within the volume intermediate the poles and symmetrically positioned about the axis thereof.

14. Apparatus for producing a magnetic field for supporting in stable equilibrium a spherical diamagnetic body including: a first body of magnetic material having a frusto-conical shape, the axis of the first body being vertically disposed with the smaller diameter surface uppermost; the diameter of the surface being substantially smaller than the diameter of the spherical body, a second body of magnetic material having a lower surface confronting the first body and vertically spaced therefrom, the second body having formed therein a frusto-conical cavity defining an inner surface extending through the second body to the lower surface thereof, the slope of the inner surface being greater than that of the lower surface, the junction of the inner surface and the lower surface thereby defining an annular area having a diameter larger than that of the spherical body, the cavity being coaxial with the first body, means to establish the first and second bodies as magnetic poles of opposite polarity thereby to produce a magnetic field volume of high inhomogeneity between the uppermost surface of the first body and the annular area of the second body, the spherical body being normally suspended within the field volume and symmetrical about the common axis of the first and second bodies.

15. Apparatus as defined in claim 14 wherein the pole establishing means comprises a permanent magnet having opposite poles thereof magnetically interconnected with the first and second bodies through a low reluctance flux path.

16. Apparatus as defined in claim 14 wherein the pole establishing means comprises a plurality of permanent magnets; separate magnets of the plurality having opposite poles magnetically connected with the first and second bodies respectively, and a low reluctance flux path interconnecting the plurality of permanent magnets.

17. Apparatus as defined in claim 14 wherein the pole establishing means comprises at least one electromagnetic coil enclosing the first body, and a source of electrical energy connected to the coil to produce a current flow therein.

18. Apparatus as defined in claim 17 wherein the electromagnetic coil is made of superconducting material; the combination also including cryogenic refrigeration means to maintain the coil in a superconductive state, and means for providing a circuit through the coil shunting the source when the desired current flows in the coil.

19. Apparatus for producing a magnetic field for supporting in stable equilibrium a spherical diamagnetic body of predetermined dimensions comprising: first and second annular permanent magnets, each of the first and second magnets having a substantially U-shaped cross-section thereby to define two parallel circular poles of opposite polarity for each magnet, the parallel planes of the poles being axially spaced a predetermined distance apart with the larger diameter pole being the more prominent; the diameter of the more prominent of the circular poles being larger than the diameter of the spherical body and the diameter of the other pole being smaller than the diameter of the spherical body, the first and second annular magnets being coaxially disposed a predetermined distance apart with the larger of the circular diameters confronting one another thereby to define a magnetic field volume of high inhomogeneity wherein a point substantially central of the volume has a relative minimum field intensity, the spherical body being normally suspended in the volume whereby magnetic forces tend to maintain the body in a position which is symmetrical about the central point.

20. Magnetic suspension apparatus including the combination of; a spherical body of diamagnetic material, means to produce a magnetic field for supporting the spherical body in stable equilibrium, the means including at least one electromagnetic coil of superconductive material, the coil being adapted to produce a substantially conical magnetic field of high inhomogeneity symmetrically about the axis of the coil in accordance with the current flow therein, means to provide a cryogenic atmosphere around the coil, the means including a thermally insulative container having therein a quantity of cryogenic refrigerant sufficient to maintain the coil in a superconductive state, a source of electrical energy adapted to be connected to the coil to establish current flow in the coil, an evacuated enclosure adapted to receive the spherical body, the enclosure being disposed within the container and extending into the magnetic field whereby the spherical body may be freely suspended within the enclosure by the magnetic field.

21. Sensing apparatus including: a spherical body of diamagnetic material; means to define a magnetic field volume including an area of high flux concentration from which flux lines diverge symmetrically about an axis taken normal to the area whereby the magnetic field intensity decreases rapidly with the distance along the axis from the area, and increases rapidly with the radial distance from the axis; the body being normally disposed with the volume in a position which is substantially symmetrical about the axis, and means to detect a change in the attitude of the spherical body.

22. Apparatus for the detection of changes in the orientation of a primary body comprising: solid spherical body of diamagnetic material, a first annular magnetic pole adapted to be attached to the primary body, a second annular magnetic pole opposite in polarity to the first pole and adapted to be attached to the primary body, the second pole being disposed a predetermined distance from and coaxial with the first pole thereby to define an inhomogeneous magnetic field of substantially frustoconical shape, the spherical body being freely suspended in a normal position which is symmetrical about the field axis, means to impart a rotational motion to the spherical body to thereby define a spin axis of the spherical body, the spin axis having a predetermined attitude with respect to the field axis, and means associated with the primary body and effective to detect a change in the orientation of the spin axis with respect to the primary body.

23. A gyroscopic device comprising the combination of a spherical body of diamagnetic material; means to define a magnetic field volume, the means including an area of high magnetic flux concentration from which flux lines diverge symmetrically about an axis taken normal to the area, whereby the magnetic field intensity decreases rapidly with the distance along the axis from the area, and increases rapidly with the radial distance from the axis; the spherical body being freely suspended in a predetermined normal position which is symmetrical about the field axis wherein a force tending to displace the spherical body radially from the field axis or axially toward the area of flux concentration is opposed by a magnetic force the intensity of which increases with the displacement, power means to impart a rotational motion to the spherical body thereby defining a spin axis of the body, the spin axis having a predetermined orientation with respect to the field axis, and means to detect a change in the orientation of the spin axis with respect to the field axis.

24. A gyroscopic device comprising the combination of a solid spherical body of diamagnetic material; means to define a magnetic field volume, the means including an area of high magnetic flux concentration from which flux lines diverge symmetrically about an axis taken normal to the area, whereby the magnetic field intensity decreases rapidly with the distance along the axis from the area, and increases rapidly with the radial distance from the axis; cup-shaped support means adapted to receive the spherical body in engagement therewith and disposed in a predetermined position within the magnetic field volume, the predetermined position being symmetrical about the axis of the field, power means to rotate the support means and the spherical body thereby defining a spin axis of the spherical body, means to energize the area of flux concentration, and means to detect a change in the predetermined orientation of the spin axis with respect to the field axis.

25. Apparatus for supporting in stable equilibrium a spherical body of diamagnetic material including: at least one electromagnetic coil of superconductive material, the coil being adapted to produce a substantially conical magnetic field of high inhomogeneity symmetrically about the axis of the coil in accordance with the current flow therein, means to provide a cryogenic atmosphere around the coil, the means including a thermally insulative container having therein a quantity of cryogenic refrigerant sufficient to maintain the coil in a superconductive state, a source of electrical energy adapted to be connected to the coil to establish current flow therein, an evacuated enclosure adapted to receive the spherical body, the enclosure extending through the coil to substantially enclose the magnetic field, means disposed within the enclosure to impart a rotational motion to the spherical body thereby defining a spin axis of the body, the spin axis having a predetermined orientation with respect to the axis of the coil, and means to detect a change in the predetermined orientation.

26. Apparatus as defined by claim 25 wherein the means to impart the rotational motion comprises a motor, a shaft mechanically connected to the motor and adapted to be rotated thereby, a cup-shaped member connected to the shaft and rotatable therewith, the cup-shaped member being adapted to receive the spherical body.

27. Apparatus as defined by claim 25 wherein the orientation detecting means comprises an optical system including a source of radiant energy adapted to be directed toward the spherical body, and a plurality of radiant energy sensitive receptors adapted to produce respective signals in accordance with the magnitude of radiant energy reflected thereto from the spherical body, the spherical body having a surface of irregular reflectivity to radiant energy.

References Cited by the Examiner

UNITED STATES PATENTS

| 2,377,175 | 5/1945 | Peer | 74—5 X |
| 2,566,221 | 8/1951 | Lovell | 74—5 X |
| 2,916,279 | 12/1959 | Stanton | 73—517 |
| 2,942,479 | 6/1960 | Hollmann | 74—5.6 |

OTHER REFERENCES

Zeitschrift Fur Physik vol. 112, April 1939, pages 753–769, by Werner Braunbek.

Philips Technical Review, vol. 18. No. 4/5, Oct. 20, 1956, pages 125–127 "Levitation by Static Magnetic Fields," by A. H. Boerdijk.

BROUGHTON G. DURHAM, *Primary Examiner.*

SAMUEL FEINBERG, *Examiner.*